US008619667B2

(12) United States Patent
Nasshan

(10) Patent No.: US 8,619,667 B2
(45) Date of Patent: Dec. 31, 2013

(54) METHOD AND DEVICE FOR TRANSMITTING DATA OF A SUBSCRIBER-SPECIFIC CONTROL CHANNEL IN A RADIO SYSTEM

(75) Inventor: Markus Nasshan, Erding (DE)

(73) Assignee: Siemens Aktiengesellschaft, Munich (DE)

( * ) Notice: Subject to any disclaimer, the term of this patent is extended or adjusted under 35 U.S.C. 154(b) by 1891 days.

(21) Appl. No.: 10/475,438

(22) PCT Filed: Apr. 5, 2002

(86) PCT No.: PCT/DE02/01259
§ 371 (c)(1),
(2), (4) Date: Oct. 20, 2003

(87) PCT Pub. No.: WO02/087264
PCT Pub. Date: Oct. 31, 2002

(65) Prior Publication Data
US 2004/0121780 A1    Jun. 24, 2004

(30) Foreign Application Priority Data

Apr. 20, 2001   (DE) .................................. 101 19 449

(51) Int. Cl.
*H04J 3/08* (2006.01)
(52) U.S. Cl.
USPC ........... 370/326; 370/206; 370/437; 370/465; 370/468; 370/477

(58) Field of Classification Search
USPC .......... 370/206, 315, 329, 465; 375/130, 148, 375/260, 261; 455/69, 450, 455, 511
See application file for complete search history.

(56) References Cited

U.S. PATENT DOCUMENTS

| 5,442,809 A | 8/1995 | Diaz et al. |
| 5,553,069 A * | 9/1996 | Ueno et al. ..................... 370/315 |
| 5,701,584 A | 12/1997 | Dupuy ..................... H04B 7/00 |
| 6,047,187 A * | 4/2000 | Haartsen ....................... 455/450 |
| 6,175,550 B1 * | 1/2001 | van Nee ........................ 370/206 |
| 6,215,814 B1 * | 4/2001 | Ylitalo et al. ................. 375/148 |

FOREIGN PATENT DOCUMENTS

| CN | 1111890 A | 11/1995 | ............... H04B 7/26 |
| CN | 1291033 A | 4/2001 | ................ H04J 3/00 |
| EP | 1089506 A2 | 4/2001 | ................ H04J 3/00 |
| WO | WO 00/02401 | 1/2000 | |

* cited by examiner

Primary Examiner — Adolf DSouza
(74) Attorney, Agent, or Firm — King & Spalding L.L.P.

(57) ABSTRACT

The present invention aims at providing flexible and optimal configuration of an air interface of a transmitter in a radio system, more particularly a mobile radiotelephone system. According to the present invention, the data of a subscriber-specific control channel transmitted by the transmitter is transmitted with an adaptively modifiable frequency position or band width. The subscriber-specific control channel may include pilot symbols for channel evaluation, TCP symbols for power regulation, TFI symbols for transmitting transmission format information and other symbols, wherein the desired frequency position or band width can be individually adjusted for the individual symbol groups.

20 Claims, 2 Drawing Sheets

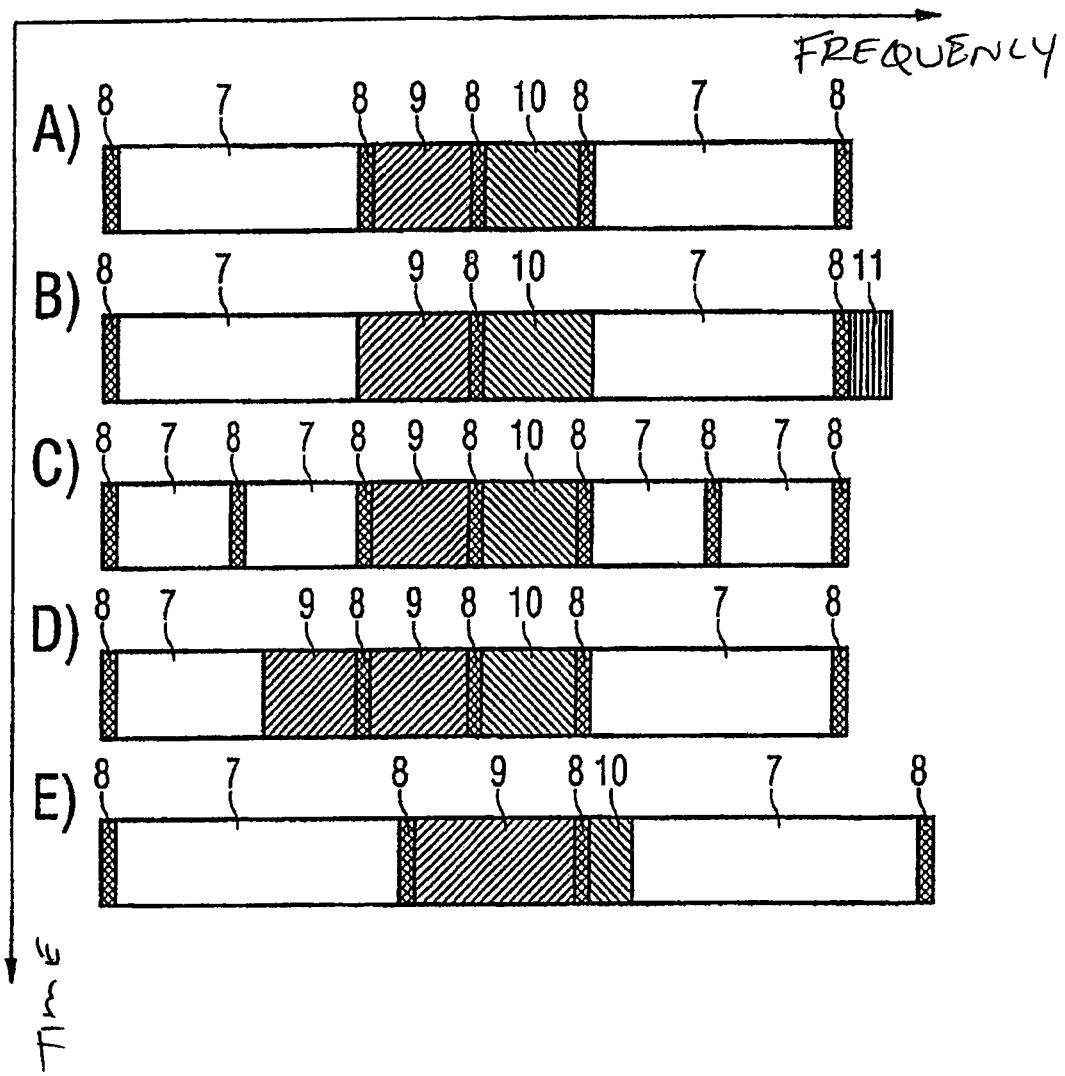

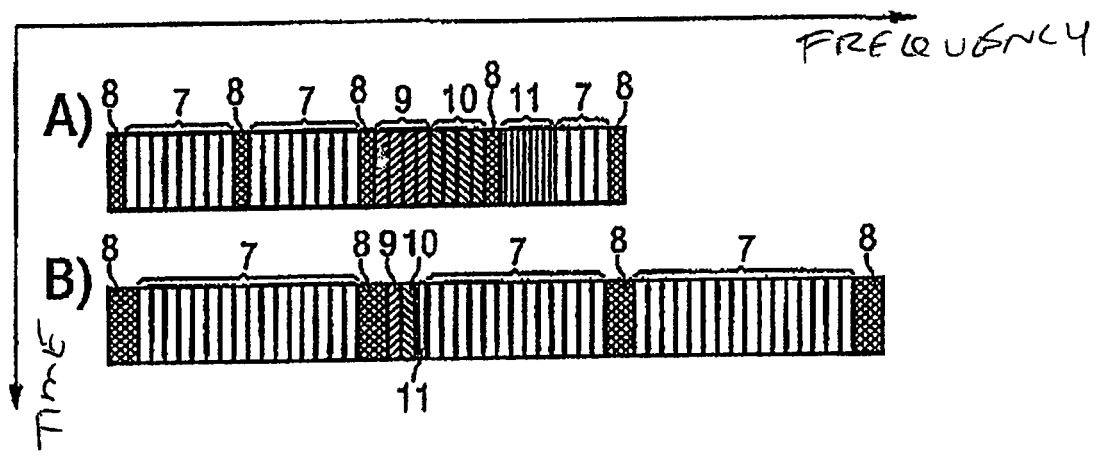
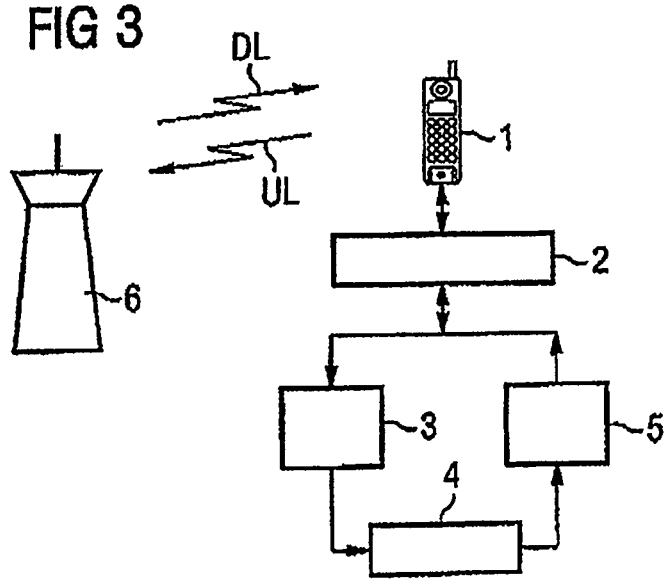

METHOD AND DEVICE FOR TRANSMITTING DATA OF A SUBSCRIBER-SPECIFIC CONTROL CHANNEL IN A RADIO SYSTEM

BACKGROUND OF THE INVENTION

The present invention relates to a method and a correspondingly configured device for transmitting data of a subscriber-specific control channel in a radio system. In particular, the present invention relates to such a method and a correspondingly configured device for transmitting data of a subscriber-specific control channel, including different symbols with control functions (such, as for example, symbols for evaluating the transmission characteristic of the respective transmission channel, symbols for power regulation or symbols with details of format information) in a radio system; in particular, a mobile radio system.

The functionality of a transmitter or receiver, such as a mobile station or a base station in a mobile radio system, is generally described in radio systems in the form of a layer model, wherein the various functionalities of the respective transmitter or receiver are assigned to different layers. In radio systems, data of higher layers (layers 2, 3 or higher) is transmitted via the air interface (layer 1). It is characteristic of radio systems that the air interface of the respective transmitter or receiver represents the bottleneck in respect of data rate (kbit/s) and transmission capacity (bit/s/Hz). New radio systems, therefore, have to be designed and operated so that the air interface is configured as optimally as possible. Optimization criteria here can, for example, be the maximum data rate of one or more subscribers, the spectral capacity of an individual radio cell or the system as a whole, etc. Adaptive configurability of the air interface is desirable here, as optimum or optimized configuration of the air interface depends on many parameters, such as the environment or characteristic of the transmission channels, the nature of the radio cells, the nature of the multiple access method used (TDD (Time Division Duplex) or FDD (Frequency Division Duplex)), the current speed of the respective subscriber, the data rate, the system load and the nature of the data transmission (e.g. packet-based or continuous, etc.). The configuration of the air interface here is generally subscriber-specific (dedicated) and dependent on the parameters listed above.

In UMTS (Universal Mobile Telecommunication System) mobile radio systems, a subscriber-specific control channel is used to configure the air interface of the respective receiver and is referred to as the Dedicated Physical Control Channel (DPCCH). Using this DPCCH channel, information is transmitted to the respective receiver which can use the information to configure its air interface. In particular, this DPCCH channel contains data blocks with $N_{pilot}$ pilot symbols for evaluating the transmission characteristic of the respective radio channel, $N_{TPC}$ TPC (Transmit Power Control) symbols with information for power regulation and $N_{TFI}$ TFI (Transmit Format Indicator) symbols with format information or for combining the services to be transmitted (voice, circuit-switched data, packet data, etc.).

Depending on the combination of the parameters listed above, different numbers of symbols are required for the individual data blocks of the DPCCH channel.

For transmission of the DPCCH channel in the FDD mode of UMTS mobile radio systems, a method is known for transmitting the DPCCH channel in the downlink (i.e., during transmission from a base station to a mobile station), including one data block each with pilot symbols, TPC symbols and TFI symbols according to a time multiplex method with the corresponding subscriber-specific data channel (dedicated physical data channel, DPDCH). In other words, data of the DPDCH channel and data of the DPCCH channel are transmitted in succession in respect of time. In the uplink (i.e., during transmission from a mobile station to a basestation), on the other hand, what is known as an I-Q multiplex combination of the DPCCH and DPDCH channels takes place.

With regard to transmission of the DPCCH channel, it already has been proposed that the number of pilot symbols, TPC symbols and TFI symbols should be configured in a variable manner. In particular, it already has been proposed that the values $N_{pilot}$, $N_{TPC}$, $N_{TFI}$ should be modified adaptively or optimized during an existing connection by a layer 2/3 signaling, which is transmitted via the DPDCH channel.

An object of the present invention is to propose an alternative method and a correspondingly configured device for transmitting data of a subscriber-specific control channel in a radio system, such as the DPCCH channel in a UMTS mobile radio system, so that the greatest possible flexibility is achieved with the transmission of data of the subscriber-specific control channel, in order to be able to respond as quickly as possible depending on the combination of the parameters disclosed above, on which the configuration of the air interface in a transmitter or receiver of the radio system depends, and to be able to achieve a correspondingly optimized configuration of the air interface.

SUMMARY OF THE INVENTION

According to the present invention, data of a subscriber-specific control channel is transmitted using an adaptively modifiable frequency position or bandwith; i.e., the subscriber-specific control channel is implemented adaptively in the frequency range.

In mobile radio systems, for example, such as those according to the UMTS mobile radio standard, the subscriber-specific control channel can be what is known as the DPCCH channel, which has both pilot symbols for channel evaluation as well as TPC symbols for power regulation and TFI symbols for format information. Each of these data blocks can be transmitted using an adaptive bandwidth or frequency position; i.e., it is possible during an existing connection to modify adaptively or optimize via a corresponding layer 2/3 signaling, which is preferably transmitted via the corresponding subscriber-specific data channel, such as the DPDCH channel in UMTS mobile radio systems.

The overall bandwidth made available to a subscriber may be either constant or variable.

Frequency spectra which do not necessarily have to be contiguous can be assigned to the individual data blocks. In this respect, various embodiments of the present invention are presented which can be adjusted based on the operating conditions of the respective radio system (i.e., based on the current combination of the parameters disclosed above), via a corresponding layer 2/3 signaling.

The multiple access method preferred for fourth-generation mobile radio systems is what is known as the OFDM (Orthogonal Frequency Division Multiplexing) method. Here, data blocks or data bursts are expanded cyclically and modulated in the frequency range. Using the OFDM method allows a transmission channel which exhibits relatively high levels of distortion with conventional transmission methods to be transformed into a channel without inter-symbol interference.

When using an OFDM method, both the data of the subscriber-specific data channel (DPDCH) and the data of the subscriber-specific control channel (DPCCH) is transmitted with a number of sub-carriers, also referred to as OFDM carriers or sinuids. The transmission proposed according to the present invention of the subscriber-specific control channel with variable or adaptively modifiable bandwidth or frequency position can be implemented simply by varying the number and configuration of sub-carriers used in each instance for the individual data blocks correspondingly.

Different embodiments are also proposed for the transmission of data according to the OFDM method wherein they can be selected as required on the basis of the operating situation.

The present invention is described in more detail below with reference to the attached figures using advantageous and preferred exemplary embodiments. In particular, the present invention is described here on the assumption that the transmission of data of the subscriber-specific control channel and the subscriber-specific data channel takes place in a UMTS mobile radio system. Of course, the present invention is not restricted to this area of application but can, in principle, be used in any radio system in which a subscriber-specific control channel which contains specific control information for the receiver is transmitted from a transmitter to a receiver.

BRIEF DESCRIPTION OF THE FIGURES

FIGS. 1A-1E show different exemplary embodiments of an inventive variation of the bandwidth or frequency position for the transmission of a DPCCH channel and a DPDCH channel.

FIGS. 2A and 2B show different exemplary embodiments of an inventive variation of the bandwidth or frequency position made available for the DPDCH channel and the DPCCH channel using an OFDM method, with the data being transmitted with a number of sub-carriers in each instance.

FIG. 3 shows a simplified block diagram of a mobile radio system according to the present invention.

DETAILED DESCRIPTION OF THE INVENTION

According to the present invention, it is proposed that the transmission of the subscriber-specific control channel (i.e., the DPCCH channel (Dedicated Physical Control Channel)), should be implemented adaptively in the frequency range so that data of the DPCCH channel is transmitted with an adaptively modifiable bandwidth or frequency position. The frequency position or bandwidth of the individual data blocks of the DPCCH channel can, thereby, be individually adjusted (i.e., the frequency position or bandwidth of the pilot symbols which are used for receiver-side channel evaluation, the frequency position or bandwidth of the TPC symbols which are used for receiver-side power regulation, the frequency position or bandwidth of the TFI symbols which are used for transmitting format information, and/or the frequency position or bandwidth of other symbols of the DPCCH channel can be adjusted individually), in order to allow optimized configuration of the air interface. The bandwidth or frequency position of the pilot symbols is hereafter referred to as $B_{pilot}$, the bandwidth of the TPC symbols as $B_{TPC}$, the bandwidth of the TFI symbols as $B_{TFI}$ and the bandwidth of the other symbols of the DPCCH channel as $B_{other}$.

During an existing connection the values for $B_{pilot}$, $B_{TPC}$, $B_{TFI}$ and $B_{other}$ can be adaptively modified or optimized by a corresponding layer 2/3 signaling which is transmitted via the corresponding subscriber-specific data channel (Dedicated Physical Data Channel) DPDCH. The overall bandwidth $B_{total}$ made available to a subscriber may be either constant or variable. The overall bandwidth $B_{total}$ made available to a subscriber is hereby defined as follows:

$$B_{total}=B_{DPCCH}+B_{DPDCH}=B_{pilot}+B_{TPC}+B_{TFI}+B_{other}+B_{DPDCH}.$$

Here $B_{DPCCH}$ designates the overall bandwidth for transmission of the symbols of the DPCCH channel and $B_{DPDCH}$ the overall bandwidth for transmission of the symbols of the DPDCH channel. The frequency spectra of a subscriber allocated to $B_{pilot}$, $B_{TPC}$, $B_{TFI}$ and $B_{other}$ also may be non-contiguous, as can be seen from the description below of different exemplary embodiments with reference to FIG. 1 and FIG. 2.

First, however, the basic mode of operation of the present invention shall be described with reference to FIG. 3, with the assumption that the radio system is a mobile radio system with communication between a mobile station 1, which is in the form of a mobile telephone in the exemplary embodiment shown, and a base station 6. It is further assumed that the mobile station 1 is a device configured according to the present invention which transmits a subscriber-specific control channel or DPDCH channel with an adaptively modifiable frequency position or bandwidth to the base station 6. Communication from the mobile station 1 to the base station 6 takes place via what is known as the uplink UL, while communication from the base station 6 to the mobile station 1 takes place via what is known as the downlink DL. The mobile station 1 receives information from the base station 6 via the downlink by a corresponding layer 2/3 signaling, which is transmitted via the DPDCH channel of the downlink DL, the information concerning how the bandwidth or frequency position of individual data of the DPCCH channel to be transmitted to the base station 6 should be adjusted. This information is fed via the air interface 2 of the mobile station 1 to the receiving part 3 of the mobile station 1 and analyzed by a control unit 4. Based on the analysis of this information, the control unit 4 activates a transmission part 5 of the mobile station 1 in order to adjust the bandwidth or frequency position of the DPCCH channel or the individual data blocks of this DPCCH channel accordingly. The information which is received by the mobile station 1 from the base station 6 can be such that it selects a specific combination from a number of possible combinations of frequency positions or bandwidths of the individual data blocks of the DPCCH channel. The information also can, however, be such that it only determines the frequency position or bandwidth for an individual data block, such as only for the pilot symbols, of the DPCCH channel. As modification of the bandwidth of a data block also generally impacts on the bandwidth of the other data blocks, it is advantageous if a number of different combinations are stored in the mobile station 1 or the corresponding transmission part 5 for the bandwidths of the individual data blocks of the DPCCH channel, wherein these only have to be read and converted on the basis of the information received.

After adjusting the bandwidth of the DPCCH channel or the individual data blocks of the DPCCH signal, data of the DPCCH channel is transmitted via the air interface 2 to the base station 6.

FIG. 1 shows different exemplary embodiments for transmission of the DPCCH channel, with the bandwidth or frequency position made available to a subscriber for both the DPCCH channel and for the DPDCH channel being varied from FIG. 1A-FIG. 1E. As already described, this is signaled to the subscriber during a connection via a corresponding layer 2/3 signaling using a received DPDCH channel.

Data of the DPDCH channel is assigned the reference 7 in each instance here, the pilot symbols of the DPCCH channel the reference 8, the TPC symbols of the DPCCH channel the reference 9, the TFI symbols of the DPCCH channel the reference 10, and other symbols of the DPCCH channel the reference 11.

It can be assumed that the case shown in FIG. 1A shows the initial situation. Here, two frequency bands are used for the DPDCH channel 7, while five frequency bands are used for the pilot symbols 8 of the DPCCH channel and one frequency band each for the TPC and TFI symbols of the DPCCH channel.

In the case shown in FIG. 1B, compared with FIG. 1A, two of the five frequency bands of the pilot symbols 8 are allocated equally in each instance to the frequency bands for the TPC symbols 9 and the TFI symbols 10. The case shown in FIG. 1B is, for example, significant when the coherence bandwidth of the radio or transmission channel is significantly larger than in the case shown in FIG. 1A. The frequency bands used according to FIG. 1B then suffice for the pilot symbols 8 at the beginning and end of the overall frequency band. According to FIG. 1B, an additional frequency band is also made available for the transmission of other data 11 of the DPCCH channel, so that the overall bandwidth made available to the subscriber is larger than in FIG. 1A.

In the case shown in FIG. 1C, compared with FIG. 1A, further frequency bands are inserted for the pilot symbols 8. This is at the expense of the bandwidth for data 7 of the DPDCH channel. The case shown in FIG. 1C can, in particular, be used with radio channels with significantly smaller coherence bandwidth than in the cases shown in FIG. 1A and FIG. 1B.

According to FIG. 1D, compared with FIG. 1A, a second frequency band is used for the transmission of the TPC symbols 9. As such, the TPC symbols can be transmitted with significantly greater reliability or significantly greater error protection than in FIG. 1A. Also in the case shown in FIG. 1D, the additional frequency band used for the TPC symbols 9 is at the expense of data of the DPDCH channel 7; in particular, at the expense of the first frequency band of the DPDCH channel.

In the case shown in FIG. 1E, the frequency bands of the DPDCH channel 7 are increased compared with the case shown in FIG. 1A. The TPC symbols 9 are also transmitted with a larger bandwidth than in FIG. 1A. The bandwidth for transmission of the TFI symbols 10 is reduced compared with FIG. 1A, which may be useful, for example, in instances where only a small number of formats is permitted for the respective subscriber, so that a smaller bandwidth than in FIG. 1A is required for the reliable transmission of this format information. Generally, according to FIG. 1E, the overall bandwidth made available to the subscriber is larger than in the cases shown in FIGS. 1A-1D.

FIG. 2A and FIG. 2B show two different exemplary embodiments for transmission of data of the DPCCH channel and the DPDCH channel according to an OFDM multiple access method, with the data of both the DPDCH channel and the DPCCH channel being transmitted with a number of sub-carriers. The transmission of data with variable bandwidth or frequency position proposed in the context of the present invention can be implemented very easily with an OFDM multiple access method, as only the number and/or configuration of the sub-carriers has to be varied accordingly, in each case, for $B_{pilot}$, $B_{TPC}$, $B_{TFI}$, $B_{other}$ and $B_{DPDCH}$. In FIG. 2A and FIG. 2B each sub-carrier is shown in the form of a narrow block.

In the case shown in FIG. 2A, five sub-carriers in total are used for the pilot symbols 8 of the DPCCH channel, the sub-carriers not being contiguous in respect of frequency but being distributed relatively evenly over the entire frequency band. Twenty sub-carriers in total are assigned to the DPDCH channel 7 and are arranged in two frequency fields, each with eight sub-carriers and one frequency band with four sub-carriers. Also, four sub-carriers are used in each case for the TPC symbols 9, the TFI symbols 10 and the other data 11 of the DPDCH channel, with the four sub-carriers being arranged on the basis of their frequency position, as shown in FIG. 2A.

FIG. 2B shows a variant of this exemplary embodiment, with four frequency fields or frequency groups in total being used, each with two sub-carriers, for the pilot symbols 8 of the DPCCH channel, the fields, in turn, being distributed relatively evenly over the entire frequency band. However, only one sub-carrier is used in each instance for the TPC symbols 9, the TFI symbols 10 and the other data 11 of the DPCCH channel, the frequency position of the sub-carrier also being shown in FIG. 2B. Compared with the case shown in FIG. 2A, according to FIG. 2B significantly more sub-carriers are assigned to the DPDCH channel 7, with the DPDCH channel 7 including 48 sub-carriers in total, which are distributed over three non-contiguous frequency fields. The overall bandwidth made available to the subscriber (i.e., the total number of sub-carriers), is larger than in FIG. 2A.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting data of a subscriber-specific control channel in a radio system, comprising:
  providing an existing connection from a transmitter to a receiver of the radio system using a subscriber-specific data channel; and
  transmitting the data of the subscriber-specific control channel during the existing connection; and
  wherein the data of the subscriber-specific control channel is transmitted in multiple frequency bands that are at least partly contiguous, each of the multiple frequency bands having a frequency position with a mean frequency and a bandwidth, and wherein at least one of (a) the number of the multiple frequency bands, and (b) the bandwidth of at least one of the frequency bands is modified adaptively during the existing connection.

2. A method for transmitting data of a subscriber-specific control channel in a radio system as claimed in claim 1, further comprising:
  transmitting data of the subscriber-specific data channel from the transmitter to the receiver in addition to the data of the subscriber-specific control channel, wherein an overall bandwidth assigned to the transmitter for transmission of the data of the subscriber-specific control channel and the data of the subscriber-specific data channel is modified adaptively.

3. A method for transmitting data of a subscriber-specific control channel in a radio system as claimed in claim 1, further comprising:
  providing a subscriber-specific data channel; and
  transmitting data of the subscriber-specific data channel from the transmitter to the receiver in addition to the data of the subscriber-specific control channel, wherein an overall bandwidth assigned to the transmitter for transmission of the data of the subscriber-specific control channel and the data of the subscriber-specific data channel remains constant.

4. A method for transmitting data of a subscriber-specific control channel in a radio system as claimed in claim 1, further comprising the step of providing that the subscriber-specific control channel include at least one of a first data group with data for receiver-side channel evaluation, a second data group with data for receiver-side power regulation, a third data group with data for transmission of transmission format information and a fourth data group for transmission of other information, wherein the at least one of the first data group, the second data group, the third data group and the fourth data group are transmitted in the multiple frequency bands.

5. A method for transmitting data of a subscriber-specific control channel in a radio system as claimed in claim 4, further comprising:
   transmitting the first data group in a first frequency band, a second frequency band, a third frequency band, a fourth frequency band and a fifth frequency band;
   transmitting information of a subscriber-specific data channel of the transmitter in a frequency range between the first and second frequency bands;
   transmitting the second data group in a frequency range between the second and third frequency bands;
   transmitting the third data group in a frequency range between the third and fourth frequency bands; and
   transmitting information of the subscriber-specific data channel of the transmitter in a frequency range between the fourth and fifth frequency bands.

6. A method for transmitting data of a subscriber-specific control channel in a radio system as claimed in claim 4, further comprising:
   transmitting the first data group in a first frequency band, a second frequency band and a third frequency band;
   transmitting information of a subscriber-specific data channel of the transmitter and the second data group in a frequency range between the first and second frequency bands; and
   transmitting the third data group and information of the subscriber-specific data channel of the transmitter in a frequency range between the second and third frequency bands.

7. A method for transmitting data of a subscriber-specific control channel in a radio system as claimed in claim 4, further comprising:
   transmitting the first data group in a first frequency band, a second frequency band, a third frequency band, a fourth frequency band, a fifth frequency band, a sixth frequency band and a seventh frequency band;
   transmitting information of a subscriber-specific data channel of the transmitter in a frequency range between the first and second frequency bands;
   transmitting information of the subscriber-specific data channel of the transmitter in a frequency range between the second and third frequency bands;
   transmitting the second data group in a frequency range between the third and fourth frequency bands;
   transmitting the third data group in a frequency range between the fourth and fifth frequency bands;
   transmitting information on the subscriber-specific data channel in a frequency range between the fifth and sixth frequency bands; and
   transmitting information on the subscriber-specific data channel in a frequency range between the sixth and seventh frequency bands.

8. A method for transmitting data of a subscriber-specific control channel in a radio system as claim in claim 4, further comprising:
   transmitting the first data group in a first frequency band, a second frequency band, a third frequency band, a fourth frequency band and a fifth frequency band;
   transmitting information of a subscriber-specific data channel of the transmitter and data of the second data group in a frequency range between the first and second frequency bands;
   transmitting the second data group in a frequency range between the second and third frequency bands;
   transmitting the third data group in a frequency range between the third and fourth frequency bands; and
   transmitting information of the subscriber-specific data channel of the transmitter in a frequency range between the fourth and fifth frequency bands.

9. A method for transmitting data of a subscriber-specific control channel in a radio system as claimed in claim 4, further comprising:
   transmitting the first data group in a first frequency band, a second frequency band, a third frequency band and a fourth frequency band;
   transmitting information of a subscriber-specific data channel of the transmitter in a frequency range between the first and second frequency bands;
   transmitting the second data group in a frequency range between the second and third frequency bands; and
   transmitting the third data group and information of the subscriber-specific data channel of the transmitter in a frequency range between the third and fourth frequency bands.

10. A method for transmitting data of a subscriber-specific control channel in a radio system as claimed in claim 4, wherein data of the subscriber-specific control channel is transmitted by the transmitter to the receiver with a plurality of sub-carriers, with each of the sub-carriers being assigned to different frequency ranges, and wherein at least one of a number and a configuration of the sub-carriers used for the data of the subscriber-specific control channel is modified adaptively by the transmitter to modify a frequency position of the data of the subscriber-specific control channel.

11. A method for transmitting data of a subscriber-specific control channel in a radio system as claimed in claim 10, further comprising:
   transmitting the first data group in a first frequency band, a second frequency band, a third frequency band, a fourth frequency band and a fifth frequency band;
   transmitting information of a subscriber-specific data channel of the transmitter in a frequency range between the first and second frequency bands;
   transmitting information of the subscriber-specific data channel in a frequency range between the second and third frequency bands;
   transmitting the second data group and the third data group in a frequency range between the third and fourth frequency bands; and
   transmitting information of the subscriber-specific data channel of the transmitter in a frequency range between the fourth and fifth frequency bands.

12. A method for transmitting data of a subscriber-specific control channel in a radio system as claimed in claim 11, further comprising:
   forming each of the first frequency band, the second frequency band, the third frequency band, the fourth frequency band and the fifth frequency band, which are assigned to the first data group, by a sub-carrier;
   assigning twenty total sub-carriers to the information of the subscriber-specific data channel; and assigning four sub-carriers to each of the second data group and the third data group.

13. A method for transmitting data of a subscriber-specific control channel in a radio system as claimed in claim 10, further comprising;
    transmitting the first data group in a first frequency band, a second frequency band, a third frequency band and a fourth frequency band;
    transmitting information of a subscriber-specific data channel of the transmitter in a frequency range between the first and second frequency bands;
    transmitting the second data group, the third data group and information of the subscriber-specific data channel of the transmitter in a frequency range between the second and third frequency bands; and
    transmitting information of the subscriber-specific data channel of the transmitter in a frequency range between the third and fourth frequency bands.

14. A method for transmitting data of a subscriber-specific control channel in a radio system as claimed in claim 13, further comprising:
    forming each of the first frequency band, the second frequency band, the third frequency band and the fourth frequency band, which are assigned to the first data group, by two sub-carriers;
    assigning 48 total sub-carriers to the subscriber-specific data channel; and
    assigning one sub-carrier to each of the second data group and the third data group.

15. A method for transmitting data of a subscriber-specific control channel in a radio system as claimed in claim 1, further comprising signaling to the transmitter via a received transmission channel how the at least one of (a) the number of the multiple frequency bands, (b) the mean frequency of at least one of the frequency bands, and (c) the bandwidth of at least one of the frequency bands of the subscriber-specific control channel is to be modified.

16. A method for transmitting data of a subscriber-specific control channel in a radio system as claimed in claim 15, further comprising signaling to the transmitter via a received transmission subscriber-specific data channel how the at least one of (a) the number of the multiple frequency bands, (b) the mean frequency of at least one of the frequency bands, and (c) the bandwidth of at least one of the frequency bands of the subscriber-specific control channel is to be modified.

17. A method for transmitting data of a subscriber-specific control channel in a radio system as claimed in claim 1, wherein data of the subscriber-specific control channel is transmitted by the transmitter to the receiver with a plurality of sub-carriers, with each of the sub-carriers being assigned to different frequency ranges, and wherein at least one of a number and a configuration of the sub-carriers used for the data of the subscriber-specific control channel is modified adaptively by the transmitter to modify a frequency position of the data of the subscriber-specific control channel.

18. A device for transmitting data of a subscriber-specific control channel in a radio system, comprising:
    a controllable transmitter for transmitting data of the subscriber-specific control channel to a receiver; and
    a controller for activating the controllable transmitter based on control information, wherein data of the subscriber-specific control channel is transmitted by the transmitter during an existing connection with the receiver, the data of the subscriber-specific control channel being transmitted in multiple frequency bands that are at least partly contiguous, each of the multiple frequency bands having a frequency position with a mean frequency and a bandwidth, and wherein at least one of (a) the number of the multiple frequency bands, and (b) the bandwidth of at least one of the frequency bands is modified adaptively during the existing connection.

19. A device for transmitting data of a subscriber-specific control channel in a radio system as claimed in claim 18, further comprising a receiver for receiving data of a transmission channel transmitted in the radio system that includes the control information for the adaptive modification of the at least one of (a) the number of the multiple frequency bands, (b) the mean frequency of at least one of the frequency bands, and (c) the bandwidth of at least one of the frequency bands of the subscriber-specific control channel.

20. A device for transmitting data of a subscriber-specific control channel in a radio system as claimed in claim 18, wherein the device is a transmission device of a mobile radio system.

* * * * *